April 17, 1951 R. F. MILLER 2,549,112
SELF-CONTAINED MECHANICAL SEAL WITH "O" RING
Filed Oct. 17, 1946

INVENTOR.
Robert F. Miller
BY Charles F. Vrtech
atty.

Patented Apr. 17, 1951

2,549,112

UNITED STATES PATENT OFFICE 2,549,112

SELF-CONTAINED MECHANICAL SEAL WITH O-RING

Robert F. Miller, Chicago, Ill., assignor to Crane Packing Company, Chicago, Ill., a corporation of Illinois Application October 17, 1946, Serial No. 703,731

4 Claims. (Cl. 286—11.14)

This invention relates to mechanical seals for effecting a seal between relatively rotatable elements and particularly to such seals which are used mainly in connection with bearings to retain grease or oil therein or in low fluid pressure systems.

The principal object of this invention is to provide a mechanical seal which is made as a complete unit and is adapted to be installed merely by pressing it into a recess in one of the relatively rotatable elements.

A more specific object of this invention is to provide a mechanical seal of the pressed-in type which utilizes as a flexible resilient sealing element a ring of rubber or the like having substantially circular radial cross-section, with means for preventing relative rotation between the sealing washer of the seal and the housing thereof.

A still more specific object of this invention is to provide an oil or grease seal having a metal retainer which is used to press the seal into place, a sealing washer, a sealing element of circular radial cross-section compressed between the retainer and washer, and driving means for the washer which prevents relative rotation between the washer and retainer, the said driving means being so constructed that relatively large helical springs can be utilized to provide the requisite sealing pressure for the sealing washer.

These and other objects of this invention will become apparent from the following detailed description when taken together with the accompanying drawings, in which Fig. 1 is a section through a fragment of a machine showing relatively rotatable elements, a bearing, and a seal, constructed in accordance with this invention, mounted in one of the elements;

Figure 1:
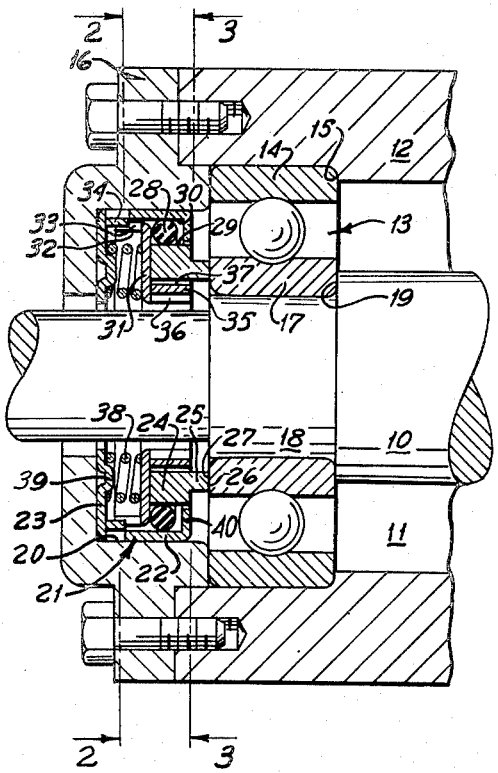

Referring now to the drawings for a more detailed description of the invention, there is shown a shaft 10 passing through an opening 11 in a housing or other stationary part of the machine, the shaft being supported from the housing 12 by a ball bearing 13. Said bearing has an outer race 14 which is held against a shoulder 15 in housing 12 by a closure-plate 16, and an inner race 17 mounted on a stepped portion 18 of shaft 10 and abutting on a shoulder 19 formed on shaft 10 by the stepped portion 18.

Closure-plate 16 has a recess 20 formed therein, said recess being utilized to receive the seal of this invention. Said seal is comprised of a retainer 21 having a cylindrical wall 22 and a radial wall 23. A washer 24 of anti-friction material is disposed partially within retainer 22 and is provided with a raised portion 25, the radial surface 26 of which abuts on the radial surface 27 of inner race 17 to form a fluid-tight seal therebetween. Washer 24 is sealed with respect to retainer 21 by means of an endless ring 28 of resilient deformable material such as rubber, either natural or synthetic or a combination of the two, said ring having a substantially circular radial cross-section. The outer cylindrical surface 29 of washer 24 and the inner cylindrical surface 30 of cylindrical wall 22 are so dimensioned with respect to the inner and outer diameters of ring 28 that said ring is normally compressed in the space formed between cylindrical walls 29 and 30. This compression of ring 28 is utilized to effect a fluid-tight seal between washer 24 and wall 22 at all times regardless of the position of washer 24 relative to retainer 21 within the working limits of the seal.

In order to relieve ring 28 of torque which may be impressed upon it by the frictional resistance of washer 24, a mechanical connection is provided between cylindrical wall 22 and washer 24 which is independent of ring 28. This connection is comprised of a rigid washer 31 of metal or the like which abuts on the back of washer 24 and extends radially outwardly beyond the outer cylindrical surface 29 of washer 24, terminating in an axially extending flange 32. It will be observed that washer 31 will restrain ring 28 from moving to the left as viewed in Fig. 1 and accordingly will assist in keeping said ring on washer 24 and confined in the space between walls 29 and 30. Flange 32 has a plurality of slots 33 formed therein, said slots receiving lugs 34 formed on the interior of cylindrical wall 22. Thus washer 31 may move axially relative to retainer 21 but is restrained against relative rotational movement with respect thereto. This relationship between lugs 34 and slots 33 is brought out more clearly in Fig. 2.

Figure 2:
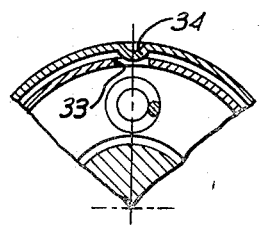
Fig. 2 is a fragmentary section of the seal taken along line 2—2 of Fig. 1.
Figure 3:
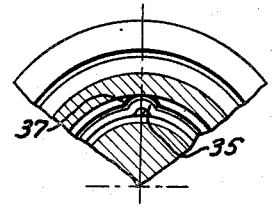
Fig. 3 is another fragmentary section taken along line 3—3 of Fig. 1.

A suitable connection is provided between washer 31 and sealing washer 24 to prevent relative rotational movement therebetween. This connection is shown in Figs. 1 and 3 and is comprised of lugs 35 formed on an axially extending flange 36 on washer 31 which telescopes within washer 24, said lugs 35 extending into grooves or notches 37 formed on the interior of washer 24. Although relative axial movement between washer 24 and washer 31 is not necessary to the successful operation of the seal herein described, nevertheless such movement is possible while at the same time relative rotational movement between the washers is prevented.

Inasmuch as washer 31 cannot rotate relative to retainer 21 and washer 24 cannot rotate relative to washer 31, it is apparent that washer 24 will be held against rotation relative to retainer 21 independently of sealing ring 28.

It is necessary to maintain sealing washer 24 in constant engagement with race 17, i. e., radial surface 26 of washer 24 should always be in contact with radial surface 27 on race 17 in order to prevent a leakage of lubricant past the seal. This constant pressure is provided by a plurality of helical springs 38 which are compressed between washer 31 and the radial wall 23 of retainer 21. To assist in locating springs 38 relative to retainer 21, wall 23 is indented as at 39 to form a plurality of bosses around which the springs may be mounted.

The seal is rendered self-contained by spinning or otherwise forming a radially inwardly extending flange 40 at the right-hand end (Fig. 1) of cylindrical wall 22 of retainer 21. Said flange 40 prevents ring 28 from moving out of retainer 21 and since washer 24 is held frictionally by ring 28, the washer is likewise held in the retainer. The spinning operation may be performed before ring 28 and washer 24 are assembled in retainer 21. This is possible because ring 28 is deformable and washer 24 has a smaller outside diameter than the internal diameter of flange 40. Thus washer 24 may be kept safely out of the way of the spinning or other forming tool, and springs 38 need not be held in compressed condition while the flange 40 is being formed.

It will be observed that washer 31 is so constructed as to leave a relatively large annular space between itself and radial wall 23 on retainer 21. This permits the use of relatively large diameter springs 38 which are somewhat less expensive to make and also give a softer action to the seal. The driving means for the washer, namely washer 31 and its connections to the outer wall 22 and sealing washer 24, do not interfere in any way with the operation of seal 28 and are relatively inexpensive to make. The assembly problem is likewise simplified as stated above, the only operation requiring special jigs or fixtures being the spinning operation which forms flange 40 radially inwardly. The seal is so designed that when washer 24 is moved axially outwardly relative to retainer 21 the maximum distance, a driving connection is still effective between lugs 34 and slots 33.

It is understood that the foregoing description is illustrative of preferred embodiments of this invention and that the scope of the invention is not to be limited thereto, but is to be determined by the appended claims.

What is claimed is:

1. A fluid seal for effecting a seal between relatively rotatable machine elements, said seal comprising a retainer having a cylindrical wall for press-fit into one of the elements, an anti-friction washer disposed at least partially within the cylindrical wall and having an outer wall spaced from the cylindrical wall, a packing ring of substantially circular radial cross-section compressed in the said space, means for preventing relative rotation between the retainer and anti-friction washer comprising a lug on the interior of the cylindrical wall, a driving washer having a slot to receive the lug and having one or more projections extending into suitable depressions in the anti-friction washer, said driving washer extending radially across the space between the anti-friction washer and the cylindrical wall to confine the packing ring and spring means acting against the driving washer to urge the anti-friction washer against the other of the relatively rotatable elements.

2. A fluid seal as described in claim 1, said rigid washer having an axially extending flange at the outer periphery thereof and the slot being formed in the axially extending flange.

3. A fluid seal for effecting a seal between relatively rotatable machine elements, said seal comprising a retainer having radial and cylindrical walls, the cylindrical wall being adapted to be pressed into one of the elements, an anti-friction sealing washer disposed at least partially within the cylindrical wall and having an outer cylindrical wall spaced from the retainer cylindrical wall, a packing ring of substantially circular radial cross-section compressed in the said space, means for preventing relative rotation between the retainer and anti-friction washer comprising a lug on the interior of the cylindrical wall, a driving washer abutting on the anti-friction washer and extending radially outward beyond the outer cylindrical wall of the anti-friction washer so as to confine the packing to the said space, said driving washer having a slot to receive the lug and having one or more projections extending into suitable depressions in the anti-friction washer, and spring means compressed between the radial wall of the retainer and the driving washer to urge the anti-friction washer against the other of the relatively rotatable elements.

4. A fluid seal as described in claim 3, said driving washer having an axially extending flange at the inner periphery thereof which telescopes into the anti-friction washer, the projections being located on the flange at the inner periphery thereof.

ROBERT F. MILLER.

REFERENCES CITED

The following references are of record in the file of this patent:

UNITED STATES PATENTS

| Number | Name | Date |
| --- | --- | --- |
| 1,425,268 | Massa | Aug. 8, 1922 |
| 1,859,436 | Durdin | May 24, 1932 |
| 1,972,393 | Radford | Sept. 4, 1934 |
| 2,365,046 | Bottomley | Dec. 12, 1944 |
| 2,379,868 | Curtis | July 10, 1945 |
| 2,429,953 | Bottomley | Oct. 28, 1947 |

FOREIGN PATENTS

| Number | Country | Date |
| --- | --- | --- |
| 266,479 | Great Britain | of 1927 |